United States Patent [19]

Marshall et al.

[11] Patent Number: 5,619,360
[45] Date of Patent: Apr. 8, 1997

[54] OPTICAL PROCESSING IN ASYNCHRONOUS TRANSFER MODE NETWORK

[75] Inventors: Ian W. Marshall, Woodbridge; Mark B. Tweddle, Bedford, both of England

[73] Assignee: British Telecommunications PLC, London, England

[21] Appl. No.: 256,535
[22] PCT Filed: Jan. 15, 1993
[86] PCT No.: PCT/GB93/00090
§ 371 Date: Sep. 8, 1994
§ 102(e) Date: Sep. 8, 1994
[87] PCT Pub. No.: WO93/14604
PCT Pub. Date: Jul. 22, 1993

[30] Foreign Application Priority Data

Jan. 16, 1992 [GB] United Kingdom ............... 9200897

[51] Int. Cl.⁶ .................................................. H04J 14/08
[52] U.S. Cl. .................................... 359/140; 359/108
[58] Field of Search ........................... 359/123, 135, 359/137, 139–140, 108; 370/42, 60, 60.1, 94.1; 385/24

[56] References Cited

U.S. PATENT DOCUMENTS 4,922,479  5/1990  Su .......................................... 359/139
5,077,727  12/1991  Suzuki ................................. 359/123

FOREIGN PATENT DOCUMENTS 1526896  10/1978  United Kingdom ............... 359/123

OTHER PUBLICATIONS

Prucnal et al. "Optically–Processed Routing For Fast Packet Switching", IEEE LSC Magazine, vol. 1, No. 2, May 1990, pp. 54–66.
Hansen et al. "Optical Demultiplexing at 6 Gb/s Using a Semiconductor Laser Amplifier as an Optical Grate", Photonics Technology Letters, vol. 3, No. 11, Nov. 1991.

Primary Examiner—Wellington Chin
Assistant Examiner—Kinfe-Michael Negash
Attorney, Agent, or Firm—Nixon & Vanderhye P.C.

[57] ABSTRACT

An optical code recognition unit (OCRU) for recognizing a predetermined n-bit optical code has an n-way splitter having an input and n parallel outputs. A plurality of combiners are associated with the splitter outputs, and a respective gate is controlled by the output of each of the combiners. Each of the splitter outputs is subject to a different delay of from 0 to (n−1) bit periods, and each combiner receives an input from at least one of the splitter outputs. The OCRU is such that all the gates are turned on if a predetermined optical code is applied to the splitter input.

12 Claims, 2 Drawing Sheets

OPTICAL PROCESSING IN ASYNCHRONOUS TRANSFER MODE NETWORK

BACKGROUND OF THE INVENTION

1. Field of the Invention

This invention relates to optical processing in networks carrying packetised signals, and in particular to an all-optical code recognition unit for such a network.

2. Related Art

Optical fibre communication offers many advantages over conventional wire based systems, these advantages including reduced losses, increased bandwidth, immunity from electromagnetic interference (EMI), and a high level of security. The application of optical fibre technology into the local area network (LAN) is, therefore, of increasing interest. In the past, however, it has been assumed that optical networks will only penetrate small business and residential sectors if new broadband services are provided to offset the additional costs involved in the installation of the optical technology. Some of the broadband services that could be provided are alpha-numeric videotex (e.g. Prestel), photographic videotex, high definition television, interactive video on demand (video library), video telephony, interactive graphics and high-speed data services.

Although the importance of providing such services has been recognised for some time, it is difficult for telecommunications operating companies to predict their market potential and therefore justify a major investment. What is required is an entry strategy that allows optical technology to be installed economically for telephony and low-speed data services, while maintaining the potential for evolution at a marginal cost for future broadband services.

In known optical networks, routing of information is achieved at each node by electronic means, that is to say by detecting the received optical signal to give an electrical signal (plus detector noise). This electrical signal must be regenerated, after processing and switching to remove the noise, before the signal is re-transmitted optically. Regeneration is bit-rate dependent, and so restricts the information type that can be carried, thereby preventing the transmission of broadband services. The need for regeneration could be removed by coupling off, at each node, part of the received optical signal, the coupled-off signal being converted to an electronic signal which is electronically processed, the remaining uncoupled optical signal being rerouted by the electronic processor. Unfortunately, the electronic processing times severely limit the possible capacity of the optical links, so again the provision of broadband services is not practical. Thus, although the electronic processor can switch quickly (of the order of nanoseconds) it requires a relatively long time (of the order of microseconds) to process, and therefore to decide upon the necessary route of the signal. In this scheme, the uncoupled optical signal is delayed during the processing time by a long length of optical fibre, and this obviously increases the size of each switching node.

Optical routing of information at the nodes of such an optical network would increase the capacity of the network by reducing the processing time. Not only would this increase the capacity of the network, it would also decrease the vast delay lengths of optical fibre otherwise required. Optical signal processing is well known, but the particular method of optical routing in a given network will depend upon the nature of that network. A particularly advantageous type of optical network is the recently developed telephony passive optical network (TPON). This type of network has no routing mechanisms, that is to say all terminals receive all the information transmitted by the exchange. One of the main advantages offered by TPON is the ability to move transmission between customers. This is because the gross bit-rate used with TPON is 20 Mbit/s (chosen mainly to allow cheap CMOS realisation of signal processing chips), and this is divided into a basic granularity of 8 Kbit/s, that is to say 8 Kbit/s is the basic transmission unit that can be moved from customer to customer (or can be summed to provide channels of n×8 Kbit/s capacity). This ability suggests that TPON will be particularly applicable to the small business sector. TPON also shows great promise for the economic provision of optical fibre to the telephony customer, with major potential for later extension to broadband integrated services digital networks (ISDN).

In order to enhance management and flexibility of the core of the network of the telecommunications network, a synchronous digital hierarchy (SDH) managed transmission network is planned for implementation by BT from 1992 as a replacement for the present asynchronous trunk and junction networks. An SDH network would have four different levels, with a passive optical network (PON) at the lowest (Access) level, and a high capacity routed network at the upper (Inner Core or Long Haul) level. The Inner Core level would benefit the most from optically-controlled routing, as this level requires the largest capacity. The increase in capacity required at the Access level (because of the addition of extra services) would, however, benefit from the use of optical routing. At the Access level it is envisaged that there would be sixty-four access points to each node. It would, therefore, be possible to address each individual node by a series of code sequences, each code sequence allowing up to sixty-four permutations.

One method of implementing an SDH network, that achieves flexibility and supports the divergent needs of future services, is based on packet switching which is currently used in data networks where error-free communication is required. The protocols required for such a system contain sophisticated methods for correcting, retransmitting or re-routing packets, and so need a lot of processing which can cause long delays. To accommodate delay-critical, but error-tolerant services, such as voice, a much simpler protocol can be used to minimise the processing time required. An example of this technique, which is known as asynchronous transfer mode (ATM) is used for fast packet switching or asynchronous time division (ATD).

ATM is a label multiplexing technique that uses short, fixed length packets, or cells. The ATM cells are short to reduce packetisation delay, and are of fixed length to make it easier to bound delays through switches and multiplexers. They have short labels (or headers) to allow cells to be routed, at high speeds, by means of hardware routing tables at each switch. For large transmission bandwidths (−1 Gbit/s or more) this routing may be most effectively performed optically via optical code recognition (OCR).

The packet header and information fields must be separated at nodes where OCR of the header is to take place. This could be achieved by having the information field at bit-rates far in excess of the header bit rate and the response time of the optical code recognition unit (OCRU), so that the OCRU, being too slow to "see" the information field bit rate will only "see" a constant intensity after the header. Alternatively, and preferably, the header and information fields could be at different wavelengths, so that they may be split easily, either by a wavelength dependent coupler or by means of wavelength division multiplexing technology.

In developing a system of optical code recognition for use in optical routing of a TPON, the following requirements must be met, namely:

(a) Around 64 codes are required with the minimum of redundancy. This is due to the SDH network requiring up to 64 codes at each level of the network adequately to address each access terminal;

(b) The CCRU should be self timing, that is to say a clock signal should not be required to synchronise the OCRU;

(c) The OCRU should be realised using the minimum number of components, thus keeping cost and complexity down;

(d) The match/mismatch decision of the OCRU must be achieved very quickly (that is to say the OCRU must have lower processing times than electronic systems;) and (e) The logic level of the OCRU output should be kept to a minimum, since multiple level logic is easily degraded by the noise that is always present in real systems.

BRIEF SUMMARY OF THE INVENTION

The present invention provides an OCRU for recognising a predetermined n-bit optical code, the OCRU comprising an n-way splitter having an input and n parallel outputs, a plurality of combiners associated with the splitter outputs, and a respective gaze controlled by the output of each of the combiners, wherein each of the splitter outputs is subject to a different delay of from 0 to (n−1) bit periods, and each combiner receives an input from at least one of the splitter outputs, and wherein the OCRU is such that all the gates are turned on if a predetermined optical code is applied to the splitter input.

Advantageously, each combiner is configured to operate at 2-level logic, and the arrangement is such that, when the predetermined optical code is input to the n-way splitter, each combiner receives an input of one or more '0's or one or more '1's, and each combiner receiving '1' inputs receives a maximum of two such inputs.

Preferably, the gates are positioned in series between an input device and an output device, whereby a signal input by the input device will reach the output device if the predetermined code is input to the n-way splitter. Each of the gates may be constituted by a semiconductor laser amplifier (SLA).

The invention also provides a system for processing packetised signals in a network comprising a head-end packet signal transmitter and a plurality of customer receivers, the system comprising a respective apparatus associated with each customer receiver, each apparatus comprising separator means for separating header field information from data field information in packets, first transmission means for transmitting the header field information to a switch associated with the respective customer receiver, and second transmission means for transmitting the data field information to said switch, wherein each first transmission means includes an OCRU as defined above, and wherein each apparatus is such that the respective OCRU activates the associated switch to permit the passage of the header field information of a given packet only if the optical code contained in the header field information of that packet is the predetermined optical code of that OCRU.

Advantageously, each of said switches is a bistable switch such as an SLA.

Conveniently, a respective wavelength-dependent coupler constitutes the separator means of each apparatus.

Preferably, the second transmission means of each apparatus includes an optical delay fibre of such a length that the header field information of a given packet reaches the switch substantially as the switch is activated by the OCRU.

In a preferred embodiment, the network is a packet switched network, the head-end packet signal transmitter is a head-end packet transmitter, and the packets are cells consisting of headers and data.

BRIEF DESCRIPTION OF THE DRAWINGS

An optical routing apparatus incorporating an optical code recognition unit constructed in accordance with the invention will now be described in greater detail, by way of example, with reference to the accompanying drawings, in which.

DETAILED DESCRIPTION OF EXEMPLARY EMBODIMENTS

Figure 1:
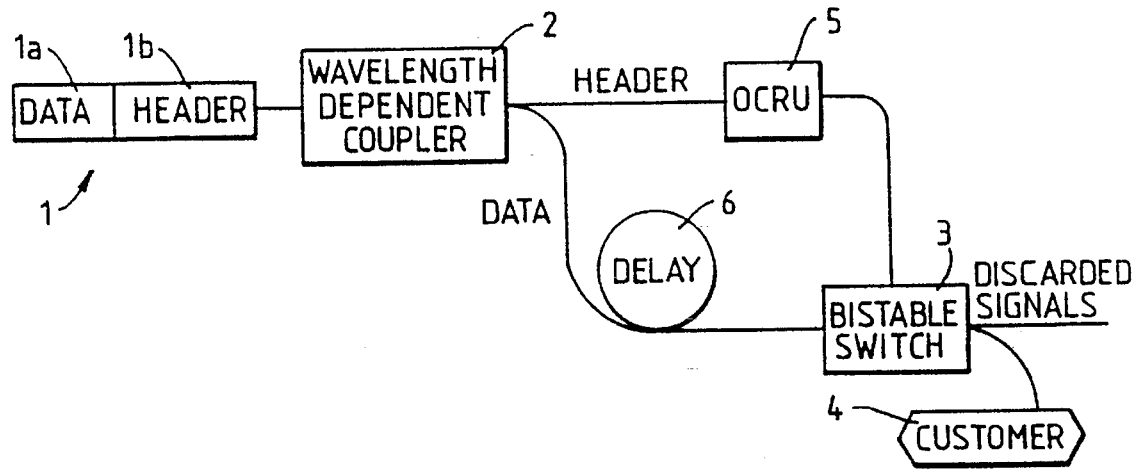
FIG. 1 is a schematic representation of the routing apparatus.

Referring to the drawings, FIG. 1 is a schematic representation of a customer-end optical routing apparatus for use with a TPON system carrying packetised signals (one cell of which is indicated by the reference numeral 1). Each cell 1 has a data field 1a and a header field 1b, these two fields being transmitted at different wavelengths. The customer-end routing apparatus includes a wavelength dependent coupler 2 which separates the header field information from the data field information. The header field information is fed to a bistable switch 3 (and then on to the customer's receiver 4) via an OCRU 5. The data field information is fed to the bistable switch 3 via a delay fibre 6. The bistable switch is constituted by a split-contact laser amplifier having a maximum rise time of less than 200 psec.

The OCRU 5 is configured to a particular optical code which is unique to the customer concerned, the optical code corresponding to all or part of the header field 1b. The OCRU 5 will, therefore, provide an output signal only when recognises the particular optical code appropriate to the customer. This output signal is used to control the bistable switch 3 so that the data field information is routed to the receiver 4. The delay fibre 6 is chosen to ensure that the data field 1a of the same cell 1 as the header field 1b recognised by the OCRU 5 is passed to the receiver 4. Consequently, signals (packets) intended for other customers will not be routed to that particular customer's receiver 4.

Figure 2:
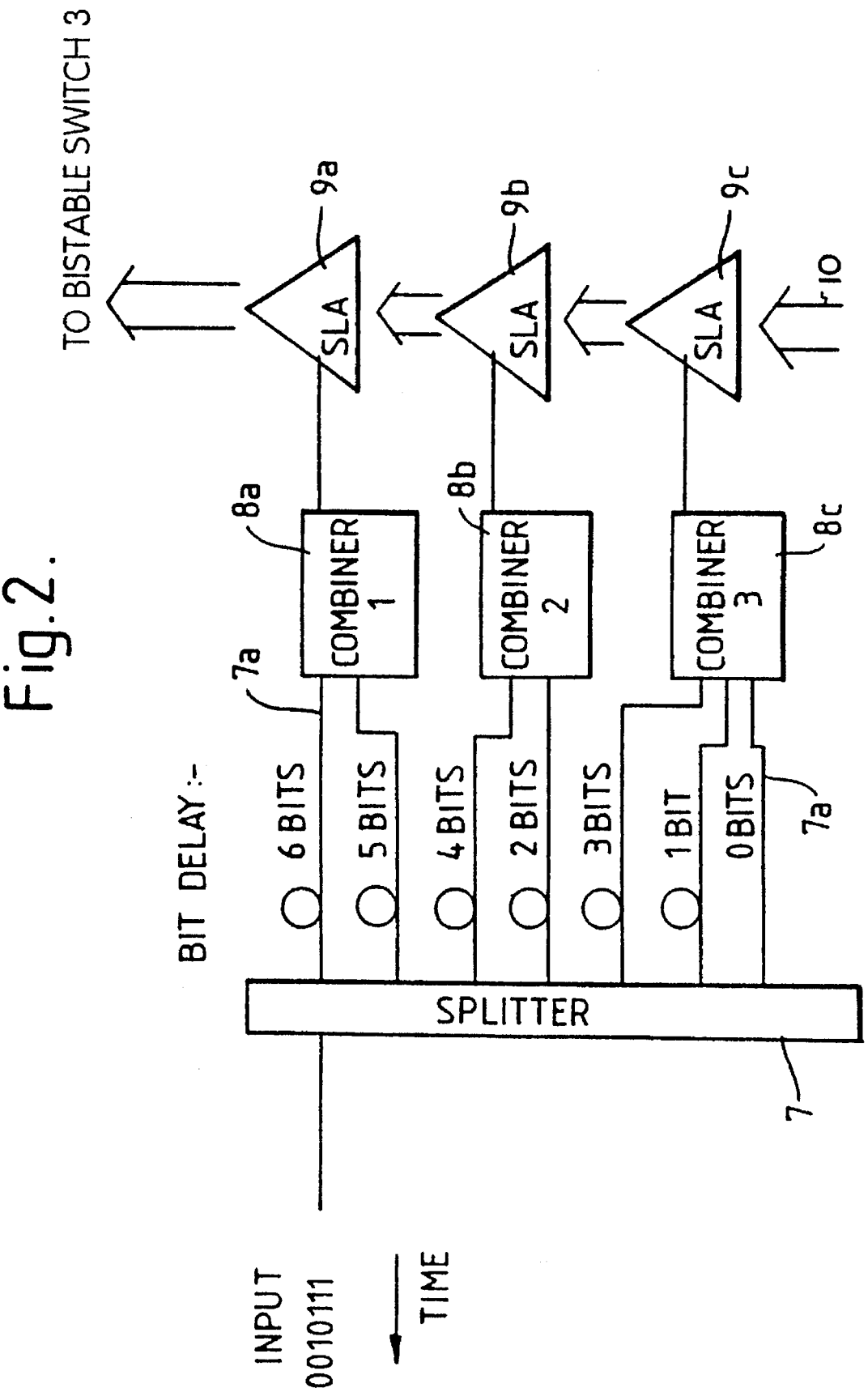
FIG. 2 is a schematic representation of an optical code recognition unit forming part of the apparatus of FIG. 1.

FIG. 2 shows the OCKU 5, this OCRU being configured to recognise the optical code 0010111. The OCRU 5 includes a passive seven-way optical splitter 7 having seven parallel output fibres 7a, three optical combiners 8a, 8b and 8c and three SLA gates 9a, 9b and 9c. Each of the fibres 7a is given a different delay of from 0 to 6 bit periods (as indicated FIG. 2). The effect of the splitter 7 is, therefore, to convert the serial input code into a parallel output code, with one bit of the code on each of the output lines 7a.

In the particular OCRU 5 shown in FIG. 2, a first pair of output lines 7a which should carry '1's are input into the optical combiner 8a, a second pair of output lines 7a which should carry '1's are input into the optical combiner 8b, and the remaining three output lines 7a (which should carry '0's)

are input into the optical combiner 8c. The combiners 8a, 8b and 8c are SLAs which operate under gain saturation. If the combiner 8a does receive two '1's at its input, its output will be at the '2' intensity level. Similarly, if the combiner 8b receives two '1's, it will output a '2', and the combiner 8c will output a '0' for three input '0's.

The SLA gate 9a, which receives the output of the combiner 8a, is configured to switch on for a '2' level input. Similarly, the gate 9b will switch on if it receives a '2' level input from the combiner 8c. Consequently, if the OCKU 5 does receive the 'correct' code 0010111, all three gates 9a, 9b and 9c will be turned on, and an input signal 10 from a continuous wave (cw) laser (not shown) will be passed to the bistable switch 3. The switch 3 will then be turned on, so that the information carried by the data field 1a of that cell whose header field 1b carries that code is passed to the associated receiver 4. It will be appreciated that a match of the code will he recognised almost instantaneously with the input of the final bit of the code, so that the processing time of the OCRU 5 is almost zero. As the combiners 8a, 8b and 8c are configured to operate at 2-level logic (that is to say they each have a three intensity level output '0', '1', '2'), the entire OCRU 5 operates at 2-level logic. This avoidance of multiple-level logic is advantageous, in that multiple-level logic is easily degraded by the noise that is always present in real systems.

Figure 3:
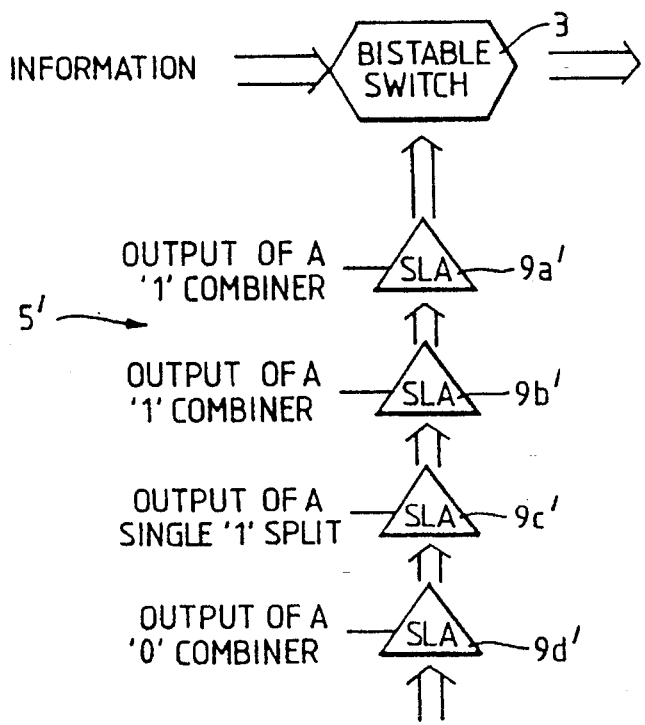
FIG. 3 is a schematic representation of part of a modified optical code recognition unit.

FIG. 3 shows the gating arrangement of an alternative form of OCRU 5', this OCRU being configured to recognise the optical code 1010111. As the OCRU 5' is required to recognise a code having an odd number of '1's, an additional (and differently-configured) SLA gate is needed. Thus, the OCRU 5' has four gates 9a', 9b', 9c' and 9d', the gates 9a', 9b' and 9d' being identical with the gates 9a, 9b and 9c of the OCRU 5 of FIG. 2. The gate 9c' is configured to switch on for a '1' level input from its combiner (not shown), this combiner being configured to output a '1' if its input receives a '1'.

Clearly, the particular form of OCRU required for each customer will depend upon the code allocated to that customer. In particular, the numbers and configurations of combiners and gates will depend upon the number of '1's in the code to be recognised. In each case, however, the OCRU will operate at 2-level logic, and maximum number of SLA gates will be four for a 7-bit code.

One disadvantage of the OCRU described above is that the bistable switch 3 outputs only the data field 1a of the recognised cell. An additional device such as an optical transmitter must, therefore, be provided to re-input the header field 1b for each such recognised cell. To remove the need for this additional device, the OCRU may be modified by replacing the coupler 2 with a 90/10 splitter, 90% the signal being directed towards the bistable switch 3, and 10% towards the OCRU. In this case, the header field 1b is distinguished from the data field 1a in the OCRU by its modulation speed (the modulation speed of the data field being too fast for the response time of the gates). When a header field 1b is recognised by the OCRU, the bistable switch 3 is triggered to pass the 90% part of the signal, so that header information is passed along with the data.

In a further alternative, a time-dependent switch can be used to separate the header field 1b from the data field 1a. This switch would be triggered by a clock signal extracted from the main input signal.

It will be apparent that the routing apparatus of the invention could handle any form of packetised signal, where the packets (or cells) are divided into header byte(s) and data byte(s), such as the ATM format. Although at the current agreed maximum rate of 140 Mbit/s optical routing is unlikely to be beneficial, standard agreement at higher rates could change this situation.

We claim:

1. An OCRU for recognising a predetermined n-bit optical code, the OCRU comprising:

an n-way passive optical splitter having an input and n parallel outputs, a plurality of combiners optically connected to the splitter outputs, and a respective gate controlled by the output of each of the combiners, wherein each of the splitter outputs is subject to a different delay of from 0 to (n−1) bit periods, and each combiner receives an input from at least one of the splitter outputs, and wherein the OCRU gates are turned on if a predetermined optical code is applied to the splitter input.

2. An OCRU as in claim 1, wherein each combiner is configured to operate at 2-level logic.

3. An OCRU as in claim 1, wherein each of the gates includes an SLA.

4. An OCRU for recognising a predetermined n-bit optical code, the OCRU comprising:

an n-way splitter having an input and n parallel outputs, a plurality of combiners optically connected to the splitter outputs, and a respective gate controlled by the output of each of the combiners, wherein each of the splitter outputs is subject to a different delay of from 0 to (n−1) bit periods, and each combiner receives an input from at least one of the splitter outputs, wherein the OCRU is such that all the gates are turned on if a predetermined optical code is applied to the splitter input, and wherein, when the predetermined optical code is input to the n-way splitter, each combiner receives an input of one or more '0's or one or more '1's, and each combiner receiving '1' inputs receives a maximum of two such inputs.

5. An OCRU for recognising a predetermined n-bit optical code, the OCRU comprising:

an n-way splitter having an input and n parallel outputs, a plurality of combiners optically connected to the splitter outputs, and a respective gate controlled by the output of each of the combiners, wherein each of the splitter outputs is subject to a different delay of from 0 to (n−1) bit periods, and each combiner receives an input from at least one of the splitter outputs, wherein the OCRU is such that all the gates are turned on if a predetermined optical code is applied to the splitter input, and wherein the gates are positioned in series between an input device and an output device, whereby a signal input by the input device will reach the output device if the predetermined code is input to the n-way splitter.

6. A system for processing packetised signals in a network comprising a head-end packet signal transmitter and an plurality of customer receivers, the system comprising:

a respective apparatus associated with each customer receiver, each apparatus comprising separator means for separating header field information from data field information in packets, first transmission means for transmitting the header field information to a switch associated with the respective customer receiver, and second transmission means for transmitting the data field information to said switch, wherein each first transmission means includes an OCRU for recognising a predetermined n-bit optical code, the OCRU comprising:

an n-way splitter having an input and n parallel outputs, a plurality of combiners optically connected to the splitter outputs, and a respective gate controlled by the output of each of the combiners, wherein each of the splitter outputs is subject to a different delay of from 0 to (n−1) bit periods, and each combiner receives an input from at least one of the splitter outputs, wherein the OCRU is such that all the gates are turned on if a predetermined optical code is applied to the splitter input, and wherein each respective OCRU activates its respective switch to permit the passage of the header field information of a given packet only if the optical code contained in the header field information of that packet is the predetermined optical code of that OCRU.

7. A system as in claim 6, wherein each of said switches is a bistable switch.

8. A system as in claim 7, wherein each of the bistable switches includes an SLA.

9. A system as in claim 6, wherein a respective wavelength-dependent coupler is included in the separator means of each apparatus.

10. A system as in claim 6, wherein the second transmission means of each apparatus includes an optical delay fibre of such a length that the header field information of a given packet reaches the switch substantially as the switch is activated by the OCRU.

11. A system as in claim 6, wherein the network is a packet switched network, the head-end packet signal transmitter is a head-end packet transmitter, and the packets are cells including headers and data.

12. An OCRU for recognising a predetermined n-bit optical code, said OCRU comprising:

an n-way passive optical splitter having a bit-serial optical input and an n-bit parallel optical output; and an optical signal logic network optically coupled to the n-way passive optical splitter outputs and to control the state of a bi-stable optical gate in response to the occurrence of a predetermined n-bit optical code input to the OCRU.

* * * * *